(12) United States Patent
Zhang

(10) Patent No.: US 9,596,520 B2
(45) Date of Patent: Mar. 14, 2017

(54) METHOD AND SYSTEM FOR PUSHING INFORMATION TO A CLIENT

(71) Applicant: TENCENT TECHNOLOGY (SHENZHEN) COMPANY LIMITED, Shenzhen (CN)

(72) Inventor: Xiang Zhang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/712,945

(22) Filed: May 15, 2015

(65) Prior Publication Data

US 2015/0249871 A1 Sep. 3, 2015

Related U.S. Application Data

(63) Continuation of application No. PCT/CN2013/086915, filed on Nov. 12, 2013.

(30) Foreign Application Priority Data

Nov. 21, 2012 (CN) .......................... 2012 1 0476618

(51) Int. Cl.
  H04N 21/81 (2011.01)
  G06F 17/30 (2006.01)
  (Continued)

(52) U.S. Cl.
  CPC ......... *H04N 21/8126* (2013.01); *G06F 17/18* (2013.01); *G06F 17/30* (2013.01);
  (Continued)

(58) Field of Classification Search
  CPC ........... H04N 21/8126; H04N 21/4223; H04N 21/8153; H04N 21/442; G06F 17/30247;
  (Continued)

(56) References Cited

U.S. PATENT DOCUMENTS

| 7,660,468 B2 * | 2/2010 | Gokturk | .............. G06F 17/3025 382/209 |
| 2008/0082426 A1 * | 4/2008 | Gokturk | ............ G06F 17/30256 705/26.62 |

(Continued)

FOREIGN PATENT DOCUMENTS

| CN | 101789111 A | 7/2010 |
| CN | 102395966 A | 3/2012 |

(Continued)

OTHER PUBLICATIONS

International Search Report for International Application No. PCT/CN2013/086915 dated Feb. 27, 2014, and its English translation thereof.

(Continued)

*Primary Examiner* — Hoang-Vu A Nguyen-Ba
(74) *Attorney, Agent, or Firm* — Harness, Dickey & Pierce, P.L.C.

(57) ABSTRACT

An information push method, includes acquiring a photo of an environment in which a client is located; recognizing a target object from the photo and collecting statistics on a frequency value or a frequency of appearance; and pushing related information of the target object to the client according to the frequency value or the frequency. An information push system, a digital television receiving terminal, and a computer storage medium are further provided. Statistics are collected on quantized data of how often a target object appears in an environment in which a client is located by using a scientific and technical means and the statistical data is used as a reference for push.

15 Claims, 4 Drawing Sheets

- S10 Acquire a photo of an environment in which a client is located
- S30 Recognize a target object from the photo and collect statistics on a frequency value or a frequency of appearance
- S50 Push related information of the target object to the client according to the frequency value or the frequency

(51) Int. Cl.
　　　*H04N 21/4223*　　(2011.01)
　　　*H04N 21/442*　　(2011.01)
　　　*G06F 17/18*　　(2006.01)
　　　*G06K 9/00*　　(2006.01)
　　　*G06K 9/62*　　(2006.01)
　　　*G06Q 30/02*　　(2012.01)

(52) U.S. Cl.
　　　CPC ... *G06F 17/30247* (2013.01); *G06K 9/00771* (2013.01); *G06K 9/6212* (2013.01); *G06Q 30/02* (2013.01); *G06Q 30/0252* (2013.01); *G06Q 30/0261* (2013.01); *H04N 21/4223* (2013.01); *H04N 21/442* (2013.01); *H04N 21/8153* (2013.01)

(58) Field of Classification Search
　　　CPC ....... G06F 17/30; G06F 17/18; G06K 9/6212; G06K 9/00771; G06Q 30/0252; G06Q 30/0261; G06Q 30/02
　　　USPC .......... 725/19; 382/115, 118, 181, 206, 209, 382/217, 218, 219, 220, 228, 237, 239, 382/251, 307; 348/254, 241, 607, 608, 348/671, 683
　　　See application file for complete search history.

(56) References Cited

U.S. PATENT DOCUMENTS

| | | | |
|---|---|---|---|
| 2009/0116695 A1* | 5/2009 | Anchyshkin | ....... G06K 9/00221 382/106 |
| 2010/0260426 A1 | 10/2010 | Huang et al. | |
| 2011/0208570 A1 | 8/2011 | Kong | |
| 2014/0193047 A1* | 7/2014 | Grosz | ................... G06F 3/1242 382/118 |

FOREIGN PATENT DOCUMENTS

| | | | | |
|---|---|---|---|---|
| CN | 102637183 A | | 8/2012 | |
| CN | 102682091 A | | 9/2012 | |
| WO | WO-2009-024990 | * | 2/2009 | ............. G06Q 30/06 |

OTHER PUBLICATIONS

International Preliminary Report for International Application No. PCT/CN2013/086915 dated May 26, 2015.
Chinese Office Action for Application No. 2012104766186 dated Jan. 28, 2016, and an English concise explanation of relevance thereof.

* cited by examiner (3.1)

(3.2)

METHOD AND SYSTEM FOR PUSHING INFORMATION TO A CLIENT

CROSS-REFERENCE TO RELATED APPLICATIONS

This application is a continuation of International Application No. PCT/CN2013/086915, filed Nov. 12, 2013. This application claims the benefit and priority of Chinese Application No. 201210476618.6, filed on Nov. 21, 2012. The entire disclosures of each of the above applications are incorporated herein by reference.

FIELD

The present disclosure relates to an information push method and system, a digital television receiving terminal, and a computer storage medium.

BACKGROUND

This section provides background information related to the present disclosure which is not necessarily prior art.

Under the current conditions of the market economy, competition has become increasingly fierce and understanding accurate information plays an extremely important role. For information push, an information pusher makes continuous improvements in how to push information with higher precision to a client. In conventional information push technology, certain sample data is generally obtained through manual survey and the sample data is then used as a primary reference for information push. Such a technology lacks support of technical means and has low reliability, in the result is a low precision of information pushed to a client.

SUMMARY

This section provides a general summary of the disclosure, and is not a comprehensive disclosure of its full scope or all of its features.

It is necessary to provide an information push method, an information push system, and a digital television receiving terminal that can improve precision of information pushed to a client.

An information push method includes the following:

acquiring a photo of an environment in which a client is located;

recognizing a target object from the photo and collecting statistics on a frequency value or a frequency of appearance; and pushing related information of the target object to the client according to the frequency value or the frequency.

It is further necessary to provide an information push system that can improve the precision of information pushed to a client.

An information push system includes:

a photo acquisition module, configured to acquire a photo of an environment in which a client is located;

a target recognition module, configured to recognize a target object from the photo and collect statistics on a frequency value or a frequency of appearance; and an information push module, configured to push related information of the target object to the client according to the frequency value or the frequency.

In the information push method and the information push system, a picture of an environment in which a client is located is acquired, a related target object is recognized from the picture, and related information of the target object is then pushed according to a frequency value or a frequency that the target object appears. Statistics are collected through scientific and technical means on quantized data of how often a target object appears in an environment in which a client is located. The statistical data is used as a reference for push, thereby achieving higher precision.

A digital television receiving terminal includes the information push system as described above. By using the information push system, the digital television receiving terminal may acquire a picture of an environment in which a television client is located, recognize a related target object from the picture, and then push related information of the target object according to a frequency value or a frequency that the target object appears. Statistics are collected through scientific and technical means on quantized data of how often a target object appears in an environment in which a television client is located. The statistical data is used as a reference for push to a television.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Implementation of an information push method of the present disclosure is described in detail below with reference to the accompanying drawings.

Figure 1:
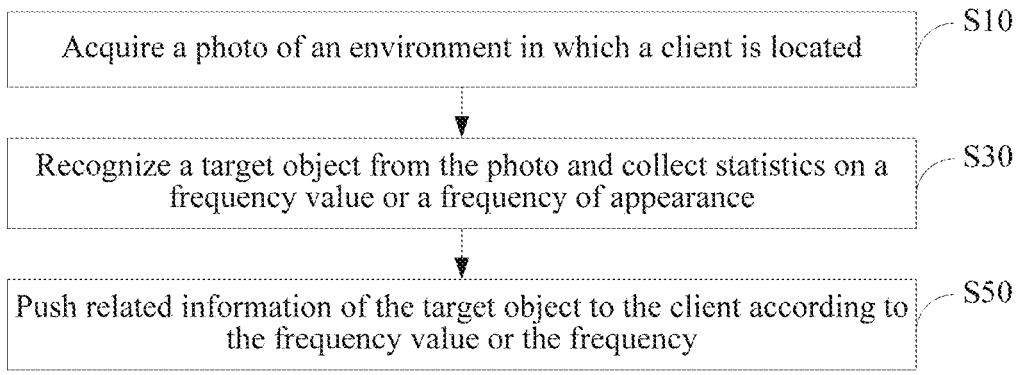
FIG. 1 is a flowchart of an information push method according to various embodiments.

FIG. 1 is a flowchart of an information push method according to various embodiments.

S10: Acquire a photo of an environment in which a client is located. According to various embodiments, a photo of a surrounding scene of the environment in which the client (that is, an information push terminal) is located may be acquired. The environment in which the client is located includes, but is not limited to, a family environment, a conference environment, an office environment, and the like. The photo of the environment in which the client is located may be acquired in a way such as regular collection and real-time photography and the photo may be used for extracting mark information of a related target object.

According to various embodiments, the photo may be acquired in real time by using a camera. The photo of the environment in which the client is located is photographed at a set time by using a camera, where the camera includes a camera of a set top box, a computer camera, a surveillance camera, and the like. The photo is taken in a regular photography manner, and in this way, influence on a client device may be reduced while a desired photo is acquired.

For example, when a photo, to be taken by using a camera of a set top box, in a home environment is acquired, the photo is taken when the set top box is idle. It is determined whether the set top box is in an idle state by detecting a use rate of a central processing unit (CPU) of the set top box. When the use rate of the CPU is lower than the threshold, it is determined that the set top box is in an idle state, and a photographing operation may be performed without affecting normal use of a client.

S30: Recognize a target object from the photo and collect statistics on a frequency value or a frequency of appearance. According to various embodiments, the related target object is mainly recognized from the photo by means of image recognition technology. Analysis processing and recognition may be performed according to a shape of an external structure or a particular mark of the target object, and the statistics are then collected on the frequency value or the frequency that the target object appears. For example, a related commodity may be recognized by identifying a mark of the commodity. Generally, a mark of a different commodity has an obvious distinguishing feature, and therefore, to recognize by using a mark has a high rate of accuracy.

Figure 2:
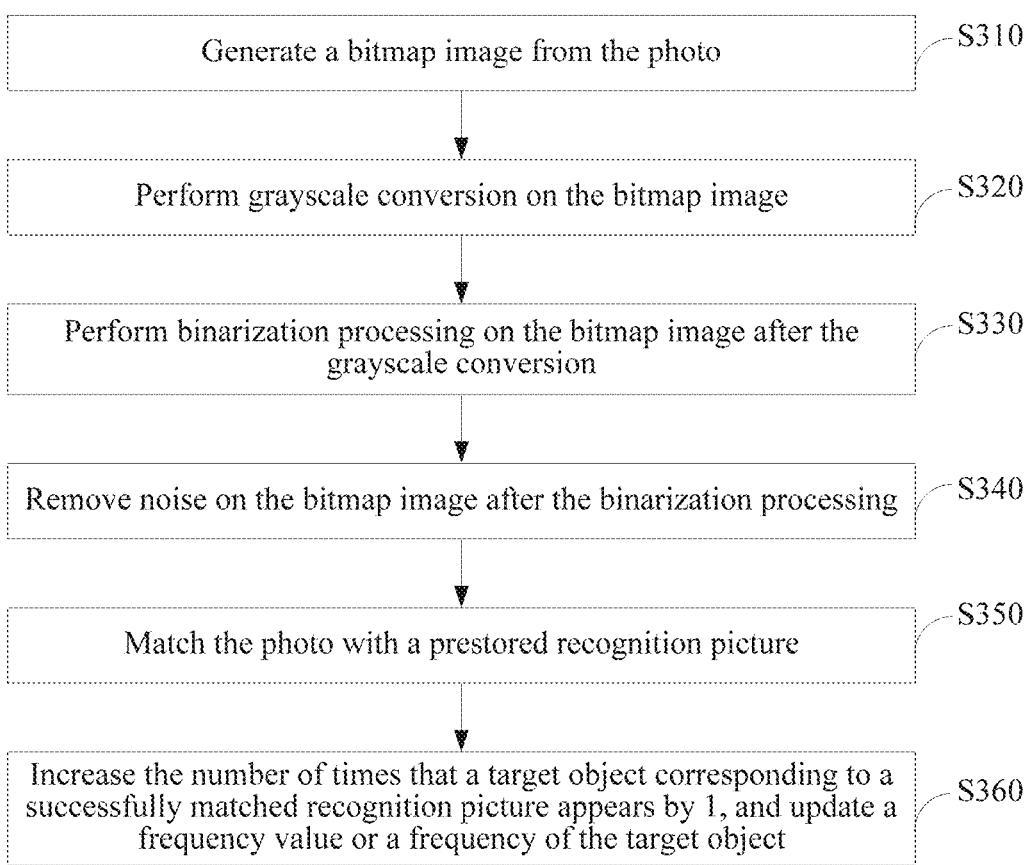
FIG. 2 is a flowchart of recognizing a target object from a photo according to various embodiments.

According to various embodiments, as shown in FIG. 2, a process of S30 includes various operations.

S350: Match the photo with a previously stored recognition picture. According to various embodiments, the related target object appearing in the photo is mainly recognized by using a technical means of image matching and a process of the photo matching includes the following.

S351: Separately perform pattern matching on matrix data of the photo and a matrix block of a recognition picture in a database. The pattern matching is performed on the matrix data previously stored in the database of recognition pictures corresponding to various target objects and the matrix block in the photo, where in a process of the pattern matching, an invariant matrix feature matching algorithm, may be used. For a commodity, a related commodity may be generally recognized by identifying a mark of the commodity as a recognition picture to match the photo.

S352: Calculate a matching degree between the photo and the recognition picture. For example, for a commodity, a matching degree between a picture of a marked part and a part of the photo may be calculated, that is, the matching degree is used as between the two.

S353: Determine, if the matching degree is greater than a set threshold, that the photo is successfully matched with the corresponding recognition picture. The matching degree obtained through decision and calculation by using the preset threshold is used. When the matching degree is greater than the threshold, it indicates that the two have high similarity and the same features, and it may then be determined that the two are successfully matched.

S360: Increase the number of times that a target object corresponding to the successfully matched recognition picture appears by 1 and update a frequency value or a frequency of the target object. According to various embodiments, it may be predetermined that a data matrix of the recognition picture of each target object corresponds to a target ID. After the photo and the recognition picture are associated in the foregoing matching process, a corresponding target ID is acquired, matching data is sent to a server, the number of times that the corresponding target object appears is increased by 1 at the server, the frequency value or the frequency that the target object appears is recalculated, and original data is updated. For example, when a commodity of a family environment is recognized by using a set top box, after the set top box recognizes a related commodity, matching data is sent to an online server and is correspondingly recorded.

According to various embodiments, in consideration that in the process of the picture matching an amount of operational data may be very large, to reduce an operational amount of data during a recognition process and improve accuracy of recognition, S30 further includes, before S350, preprocessing the photo, which includes the following.

S310: Generate a bitmap image from the photo. After BMP header information of the photo is parsed, photo data is decoded to obtain a bitmap file so that a matrix array of the photo may be obtained for subsequent processing.

Figure 3:
FIG. 3 is an effect image of a bitmap image after grayscale processing according to various embodiments.
Figure 3:

S320: Perform grayscale conversion on the bitmap image. After the grayscale conversion, color information in the image may be removed, which reduces an amount of subsequent calculation. An effect after grayscale processing is shown in FIG. 3, where (3.1) is an original picture and (3.2) is an effect image after the grayscale processing. Each picture pixel includes red green blue (RGB) data. After the grayscale processing, picture pixels all have equal RGB, and here a sum of the products of R, G, and B multiplied by respective weights of R, G, and B may be simply taken as an RGB value of the image pixel, for example, R=G=B= (R*0.3+G*0.59+B*0.11).

Figure 4:
FIG. 4 is an effect image of a photo after binarization processing according to various embodiments.
Figure 5:
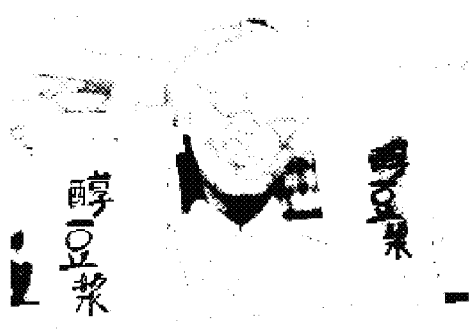
FIG. 5 is an effect image of a photo after noise removal processing according to various embodiments.

S330: Perform binarization processing on the bitmap image after the grayscale conversion. That is, each pixel of the image after the grayscale processing is converted into a black and white image. A processing manner may convert all pixel points whose image grayscale values are less than a set threshold into black points and convert points whose picture grayscale values are greater than the set threshold into white points. FIG. 4 is an effect image of the image after the binarization process, an amount of calculation of subsequent processing may be further reduced by using the binarization processing.

S340: Remove noise on the bitmap image after the binarization processing. That is, optimization processing is performed on the image after binarization to remove the noise. Noise is identified first and large and small blocks of noise are then removed. For identification of the noise, a manner of scanning a picture data matrix may be used. After a black point is scanned, neighboring pixels are recursively scanned. When continuous pixels are less than a value or greater than a value, a small block of noise or a large block of noise may be determined. 0.5 is an effect image of the image after noise removal processing. Noise may affect a determination process of image recognition, and therefore, after the foregoing optimization processing of noise removal, the accuracy of recognition may be improved.

Figure 6:
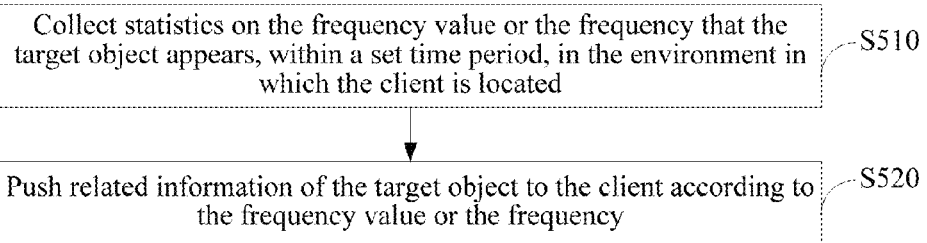
FIG. 6 is a flowchart of pushing related information of a target object to a client according to various embodiments.

S50: Push related information of the target object to the client according to the frequency value or the frequency. According to various embodiments, the frequency value or the frequency that the target object appears in the environment in which the client is located is mainly used as a reference to push the related information. For example, information that may present an attribute or feature of the target object, such as advertisement information and promotion information, of the target object to the client. As shown in FIG. 6, the process of S50 includes various operations.

S510: Collect statistics on the frequency value or the frequency in which the target object appears within a set time period in the environment in which the client is located. After a certain amount of time, statistics are collected on the frequency values or the frequencies in which various target objects appear within the set time period. Statistics are collected on the frequency value that each target object appears to determine a total number of times that the target object appears in the environment in which the client is located and how often the target object appears. Statistics are collected on the frequency that each target object appears so that a proportion of appearance of the target object to appearance of all the target objects within the set time period may be determined.

By means of collecting statistics on the frequency value or the frequency that the target object appears within a set time period in the environment in which the client is located, quantization of a degree of association between the client and the target object may be implemented, and scientific and technical quantized data may be obtained and used as a reference for information push. For example, when the target object is a commodity and information promotion needs to be performed for the commodity, in a family environment, household commodities frequently appear; in a conference environment, commodities such as devices for a conference site frequently appear; and in an office environment, commodities such as office supplies frequently appear. Statistics are collected on a frequency value or a frequency that a commodity appears in each scene so that quantized data of how often the commodity appears in each scene may be obtained and a high frequency value or a high frequency indicates a commodity that frequently appears. For example, in a family environment, a frequency value or a frequency that a household commodity appears is high, and therefore, during information promotion, statistical data is used as a reference and promotion to a client in the family environment focuses on related information of household commodities.

S520: Push related information of the target object to the client according to the frequency value or the frequency. According to various embodiments, the frequency value or the frequency in which each target object appears in the environment in which the client is located is calculated so that the frequency value or the frequency may be used as a reference, and when the related information of the target object is pushed, cross-sectional comparison and longitudinal comparison may be performed, so as to adjust information pushed to the client of the target object. For example, when the target object is a commodity, and advertisement information promotion needs to be performed for the commodity, a commodity of a high frequency value or a high frequency of appearance is selected and advertisement information of the commodity is pushed as a focus to a terminal (including a display medium such as a television and a computer) of the client, so that the pushed advertisement information has higher precision, thereby implementing precise advertisement delivery and achieving a desirable advertising effect.

Implementation of a system corresponding to the information push method of the present disclosure is described in detail below with reference to the accompanying drawings.

Figure 7:
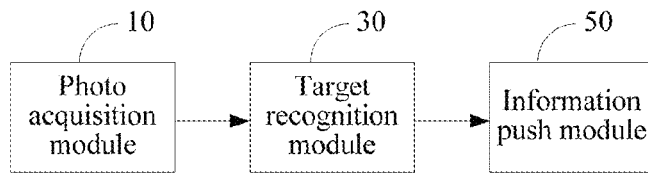
FIG. 7 is a structural diagram of an information push system according to various embodiments.

FIG. 7 is a structural diagram of an information push system according to various embodiments, the information push system mainly including a photo acquisition module 10, a target recognition module 30, and an information push module 50.

The photo acquisition module 10 is configured to acquire a photo of an environment in which a client is located. According to various embodiments, the photo acquisition module 10 may acquire a photo of a surrounding scene of the environment in which the client is located. The environment in which the client is located includes, but is not limited to, a family environment, a conference environment, an office environment, and the like. The photo of the environment in which the client is located may be acquired in a way such as through regular collection and real-time photography and the photo may be used for extracting mark information of a related target object.

According to various embodiments, the photo acquisition module 10 may acquire the photo in real time by using a camera. The photo of the environment in which the client is located is photographed at a set time by using a camera, where the camera includes a camera of a set top box, a computer camera, a surveillance camera, and the like. The photo is taken in a regular photography manner, and in this way, influence on a client device may be reduced while a desired photo is acquired.

For example, when the photo acquisition module 10 acquires a photo taken by using a camera of a set top box in a family environment, the photo is photographed when the set top box is idle. It is determined whether the set top box is in an idle state by detecting a use rate of a CPU of the set top box. When the use rate of the CPU is lower than the threshold, it is determined that the set top box is in an idle state and a photographing operation may be performed without affecting normal use of a client.

The target recognition module 30 is configured to recognize a target object from the photo and collect statistics on a frequency value or a frequency of appearance. According to various embodiments, the target recognition module 30 mainly recognizes the related target object from the photo by means of image recognition technology. Analysis processing, and recognition may be performed according to a shape of an external structure or a particular mark of the target object. For example, the target recognition module 30 may recognize a related commodity by recognizing a mark of the commodity. Generally, a mark of a different commodity has an obvious distinguishing feature, and therefore, to recognize by using a mark has high accuracy.

Figure 8:
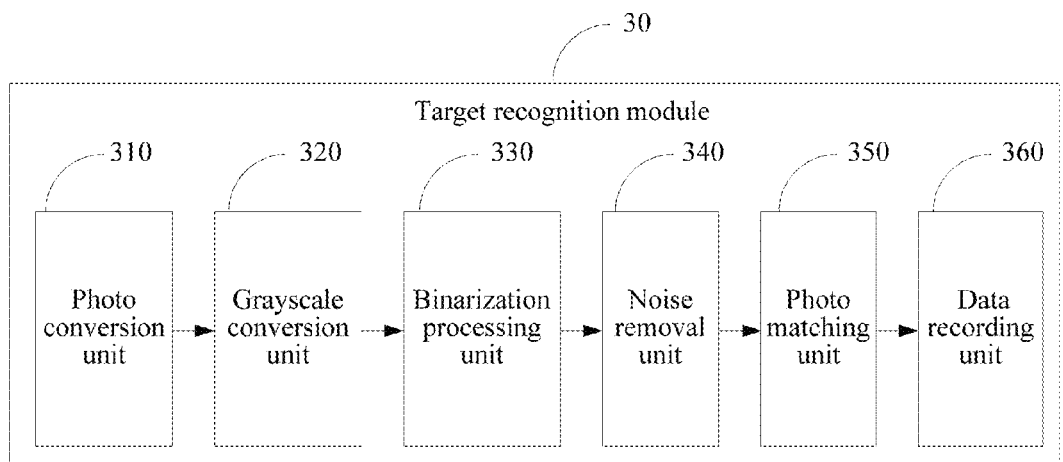
FIG. 8 is a structural diagram of a target recognition module according to various embodiments.
Figure 9:
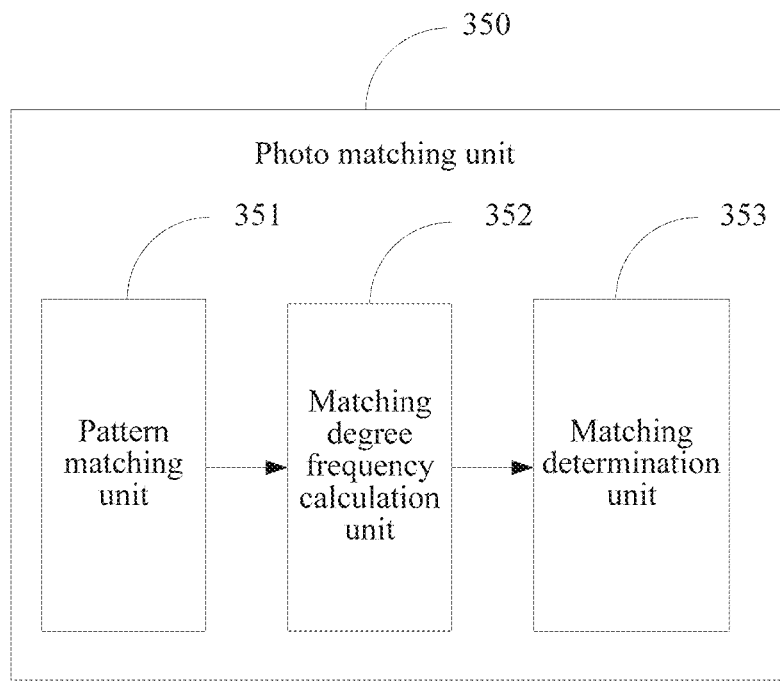
FIG. 9 is a structural diagram of a photo matching unit according to various embodiments.

The target recognition module 30, as shown in FIG. 8, further includes a photo matching unit 350 and a data recording unit 360. The photo matching unit 350 is configured to match the photo with a previously stored recognition picture. According to various embodiments, the photo matching unit 350 mainly recognizes the related target object appearing in the photo by using a technical means of image matching. As shown in FIG. 9, the photo matching unit 350 further includes a pattern matching unit 351, a matching degree frequency calculation unit 352, and a matching determination unit 353. The pattern matching unit 351 is configured to separately perform pattern matching on matrix data of the photo and a matrix block of a recognition picture in a database. According to various embodiments, the pattern matching unit 351 performs the pattern matching on the matrix data previously stored in the database of recognition pictures corresponding to various target objects and the matrix block in the photo, where in a process of the pattern matching, an invariant matrix feature matching algorithm may be used. For example, for a commodity, a related commodity may be generally recognized by identifying a mark of the commodity as a recognition picture to match the photo.

The matching degree frequency calculation unit 352 is configured to calculate a matching degree between the photo and the recognition picture.

For example, for a commodity, the matching degree frequency calculation unit 352 may calculate a matching degree between a picture of a marked part and a part of the photo, that is, use the matching degree between the two.

The matching determination unit 353 is configured to determine, if the matching degree is greater than a set threshold, that the photo is successfully matched with the corresponding recognition picture. According to various embodiments, the matching determination unit 353 uses the matching degree obtained through decision and calculation by using the preset threshold, and when the matching degree is greater than the threshold, it indicates that the two have high similarity and the same features, and it may then be determined that the two are successfully matched.

The data recording unit 360 is configured to increase the number of times that a target object corresponding to the successfully matched recognition picture appears by 1, and update a frequency value or a frequency of the target object. According to various embodiments, the data recording unit 360 may predetermine a target ID corresponding to a data matrix of the recognition picture of each target object. After the photo and the recognition picture are associated in the foregoing matching process, a corresponding target ID is acquired, matching data is sent to a server, the number of times that the corresponding target object appears is increased by 1 at the server, the frequency value or the frequency that the target object appears is recalculated, and original data is updated. For example, when a commodity of a family environment is recognized by using a set top box, after the set top box recognizes a related commodity, matching data is sent to an online server and is correspondingly recorded.

According to various embodiments, considering that in the process of the picture matching an amount of operational data may be very large, to reduce an operational amount of data during a recognition process and improve accuracy of recognition, the target recognition module 30 further includes a photo conversion unit 310, a grayscale conversion unit 320, a binarization processing unit 330, and a noise removal unit 340 that are disposed before the photo matching unit 350.

The photo conversion unit 310 is configured to generate a bitmap image from the photo. According to various embodiments, after BMP header information is parsing, the photo conversion unit 310 decodes photo data to obtain a bitmap file, so that a matrix array of the photo may be obtained for subsequent processing. The grayscale conversion unit 320 is configured to perform grayscale conversion on the bitmap image. According to various embodiments, the grayscale conversion unit 320 may remove, after the grayscale conversion is performed, color information in the image, which reduces an amount of subsequent calculation. The binarization processing unit 330 is configured to perform binarization processing on the bitmap image after the grayscale conversion. According to various embodiments, the binarization processing unit 330 may further reduce, by using the binarization processing, an amount of calculation of subsequent processing. The noise removal unit 340 is configured to remove noise on the bitmap image after the binarization processing. According to various embodiments, the noise removal unit 340 may improve, after the foregoing optimization processing of removing the noise, the accuracy of recognition.

Figure 10:
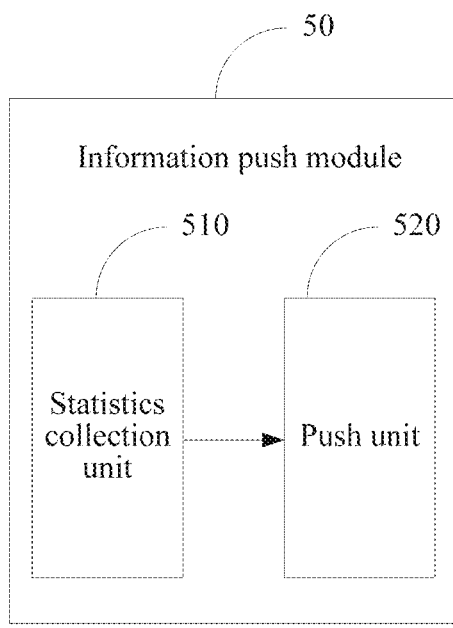
FIG. 10 is a structural diagram of an information push module according to various embodiments.

The information push module 50 is configured to push related information of the target object to the client according to the frequency value or the frequency. According to various embodiments, the information push module 50 mainly uses the frequency value or frequency that the target object appears in the environment in which the client is located as a reference to push the related information. For example, information that may present an attribute or feature of the target object, such as advertisement information and promotion information, of the target object to the client. As shown in FIG. 10, the information push module 50 further includes a statistics collection unit 510 and a push unit 520.

The statistics collection unit 510 is configured to collect statistics on the frequency value or the frequency that the target object appears within a set time period in the environment in which the client is located. According to various embodiments, after a certain period of time, the statistics collection unit 510 collects statistics on the frequency value or frequency that each target object appears within the set time period. The statistics are collected on the frequency values that each target object appears so that the total number of times that the target object appears in the environment in which the client is located and how often the target object appears may be determined. Statistics are collected on the frequency that each target object appears so that a proportion of the appearance of the target object to the appearance of all the target objects within the set time period may be determined.

By means of collecting statistics on the frequency value or the frequency that the target object appears within a set time period in the environment in which the client is located, quantization of a degree of association between the client and the target object may be implemented, and scientific and technical quantized data may be obtained and used as a reference for information push.

For example, when the target object is a commodity and information promotion needs to be performed for the commodity in a family environment, household commodities frequently appear; in a conference environment, commodities such as devices for a conference site frequently appear; and in an office environment, commodities such as office supplies frequently appear. Statistics are collected on a frequency value or a frequency that a commodity appears in each scene, so that quantized data of how often the commodity appears in each scene may be obtained and a high frequency value or a high frequency indicates a commodity that frequently appears. For example, in a family environment, a frequency value or a frequency that a household commodity appears is high, and therefore, during information promotion, statistical data is used as a reference and promotion to a client in the family environment focuses on related information of household commodities.

The push unit 520 is configured to push the related information of the target object to the client according to the frequency. According to various embodiments, the push unit 520 calculates the frequency value or the frequency that each target object appears in the environment in which the client is located, so that the frequency value or the frequency may be used as a reference, and when the related information of the target object is pushed, cross-sectional comparison and longitudinal comparison may be performed, so as to adjust information, pushed to the client, of the target object.

For example, when the target object is a commodity, and advertisement information promotion needs to be performed for the commodity, a commodity of a high frequency value or a high frequency of appearance is selected, and advertisement information of the commodity is pushed as a focus to a terminal (including a display medium such as a television and a computer) of the client, so that the pushed advertisement information has higher precision, thereby implementing precise advertisement delivery, and achieving a desirable advertising effect.

The information push systems of the present disclosure correspond to the information push methods of the present disclosure one by one, and the technical features described in the embodiments of the information push methods and the beneficial effects thereof are applicable to the embodiments of the information push system.

A digital television receiving terminal includes the information push system as described above. By using the information push system, the digital television receiving terminal may acquire a picture of an environment in which a client is located, recognize a related target object from the picture, and then push related information of the target object according to a frequency value or a frequency that the target object appears. Scientific and technical statistical data is used as a reference for information push to a television, thereby achieving higher precision. An advertisement can be precisely delivered by using the digital television receiving terminal, thereby achieving a desirable advertising effect.

In the information push method and system of the present disclosure, a photo of an environment in which a client is located is acquired, a related target object is recognized from the photo, statistics are collected on a frequency value or a frequency that the target object appears in the environment in which the client is located by using a scientific and technical means, and the statistical data is further used as a reference to push related information of a related target object to a client having a different habit. The pushed information has higher precision, which can be used for high-precision advertisement delivery, thereby reducing advertising costs and improving an advertising effect. In addition, an important role may also be played in an aspect such as an advertising effect survey and a market survey for commodities, and a precise data reference and an advanced technical support may be provided.

One of ordinary skill in the art will recognize that all or some of the procedures that implement the foregoing and the corresponding system may be implemented by a computer program instructing relevant hardware. The program may be stored in a computer readable storage medium. When the program runs, the procedures are performed. The foregoing storage medium may be a magnetic disk, an optical disc, a read-only memory (ROM), a random access memory (RAM), or the like.

Therefore, according to various embodiments, the present disclosure further provides a storage medium including a computer readable program, and when the computer readable program in the storage medium runs, the information push method, in any one of the foregoing manners, of the present disclosure may be implemented.

The methods of the various embodiments of the present disclosure as described above may be installed on a corresponding machine device in a form of software, and when the software runs, the foregoing information pushing process may be implemented by controlling a related processing device.

The foregoing embodiments describe several implementation manners of the present disclosure and their description is specific and detailed, but cannot therefore be understood as a limitation to the patent scope of the present disclosure. It should be noted that one with ordinary skill in the art may further make variations and improvements without departing from the concept of the present disclosure, and these all fall within the protection scope of the present disclosure. Therefore, the patent protection scope of the present disclosure should be subject to the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. An information push method, comprising the followings steps:
    acquiring a photo of an environment in which a client is located;
    recognizing a target object from the photo and collecting statistics on a frequency value of appearance of the target object or a frequency of appearance of the target object; and
    pushing related information of the target object to the client according to the frequency value of appearance of the target object or the frequency of appearance of the target object;
    wherein the step of pushing related information of the target object to the client according to the frequency value of appearance of the target object or the frequency of appearance of the target object comprises:
    collecting statistics on the frequency value or the frequency that the target object appears, a set time period, in the environment in which the client is located: and
    pushing the related information of the target object to the client according to the frequency value or the frequency that the target object appears.

2. The information push method according to claim 1, wherein the step of recognizing a target object from the photo and collecting statistics on a frequency value of appearance of the target object or a frequency of appearance of the target object comprises:
    matching the photo with a prestored recognition picture; and
    increasing the number of times that a target object corresponding to a successfully matched recognition picture appears by 1, and updating a frequency value of the target object or a frequency of the target object.

3. The information push method according to claim 2, before the step of matching the photo with a prestored recognition picture, further comprising:
generating a bitmap image from the photo;
performing grayscale conversion on the bitmap image;
performing binarization processing on the bitmap image after the grayscale conversion; and
removing noise on the bitmap image after the binarization processing.

4. The information push method according to claim 2, wherein the step of matching the photo with a prestored recognition picture comprises:
separately performing pattern matching on matrix data of the photo and a matrix block of a recognition picture in a database;
calculating a matching degree between the photo and the recognition picture; and
determining, if the matching degree is greater than a set threshold, that the photo is successfully matched with the corresponding recognition picture.

5. The information push method according to claim 1, wherein the target object comprises a logo of a commodity.

6. An information push system, comprising:
a memory and a processor, wherein; the memory includes a photo acquisition module, a target recognition module, and an information push module:
the photo acquisition module, executed by the processor to acquire a photo of an environment in which a client is located;
the target recognition module, executed by the processor to recognize a target object from the photo and collect statistics on a frequency value of appearance of the target object or a frequency of appearance of the target object; and
the information push module, executed by the processor to push related information of the target object to the client according to the frequency value of appearance of the target object or the frequency of appearance of the target object;
wherein the information push module comprises:
a statistics collection unit, executed by the processor to collect statistics on the frequency value or the frequency that the target object appears, within a set time period, in the environment in which the client is located: and
a push unit, executed by the processor to push the related information of the target object appears.

7. The information push system according to claim 6, wherein the target recognition module comprises:
a photo matching unit, executed by the processor to match the photo with a prestored recognition picture; and
a data recording unit, executed by the processor to increase the number of times that a target object corresponding to a successfully matched recognition picture appears by 1, and update a frequency value of the target object or a frequency of the target object.

8. The information push system according to claim 7, further comprising:
a photo conversion unit, executed by the processor to generate a bitmap image from the photo;
a grayscale conversion unit, executed by the processor to perform grayscale conversion on the bitmap image;
a binarization processing unit, executed by the processor configured to perform binarization processing on the bitmap image after the grayscale conversion; and
a noise removal unit, executed by the processor to remove noise on the bitmap image after the binarization processing.

9. The information push system according to claim 7, wherein the photo matching unit comprises:
a pattern matching unit, executed by the processor to separately perform pattern matching on matrix data of the photo and a matrix block of a recognition picture in a database;
a matching degree frequency calculation unit, executed by the processor to calculate a matching degree between the photo and the recognition picture; and
a matching determination unit, executed by the processor to determine, if the matching degree is greater than a set threshold, that the photo is successfully matched with the corresponding recognition picture.

10. The information push system according to claim 6, wherein the target object comprises a logo of a commodity.

11. One or more storage media, including at least one of a magnetic disk, an optical disc, a read-only memory, or a random access memory and including a computer-executable instruction, the computer-executable instruction being used for executing an information push method, and the method comprising the following steps:
acquiring a photo of an environment in which a client is located;
recognizing a target object from the photo and collecting statistics on a frequency value of appearance of the target object or a frequency of appearance of the target object; and
pushing related information of the target object to the client according to the frequency value of appearance of the target object or the frequency of appearance of the target object;
wherein pushing the related information of the target object to the client according to the frequency value of appearance of the target object or the frequency of appearance of the target object comprises;
collecting statistics on the frequency value or the frequency that the target object appears, within a set time period, in the environment in which the client is located; and
pushing the related information of the object to the client according to the frequency value or the frequency that the target object appears.

12. The computer storage medium according to claim 11, wherein the step of recognizing a target object from the photo and collecting statistics on a frequency value of appearance of the target object or a frequency of appearance of the target object comprises:
matching the photo with a prestored recognition picture; and
increasing the number of times that a target object corresponding to a successfully matched recognition picture appears by 1, and updating a frequency value of the target object or a frequency of the target object.

13. The computer storage medium according to claim 12, before the step of matching the photo with a prestored recognition picture, further comprising:
generating a bitmap image from the photo;
performing grayscale conversion on the bitmap image;
performing binarization processing on the bitmap image after the grayscale conversion; and
removing noise on the bitmap image after the binarization processing.

14. The computer storage medium according to claim 12, wherein the step of matching the photo with a prestored recognition picture comprises:
- separately performing pattern matching on matrix data of the photo and a matrix block of a recognition picture in a database;
- calculating a matching degree between the photo and the recognition picture; and
- determining, if the matching degree is greater than a set threshold, that the photo is successfully matched with the corresponding recognition picture.

15. The computer storage medium according to claim 11, wherein the target object comprises a logo of a commodity.

\* \* \* \* \*